(12) United States Patent
McQuillen et al.

(10) Patent No.: US 11,756,416 B2
(45) Date of Patent: Sep. 12, 2023

(54) VEHICLE TO VEHICLE AND INFRASTRUCTURE COMMUNICATION AND PEDESTRIAN DETECTION SYSTEM

(71) Applicant: Ford Global Technologies, LLC, Dearborn, MI (US)

(72) Inventors: Michael McQuillen, Warren, MI (US); Daniel A. Makled, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 84 days.

(21) Appl. No.: 16/756,886

(22) PCT Filed: Oct. 19, 2017

(86) PCT No.: PCT/US2017/057388
§ 371 (c)(1),
(2) Date: Apr. 17, 2020

(87) PCT Pub. No.: WO2019/078866
PCT Pub. Date: Apr. 25, 2019

(65) Prior Publication Data
US 2021/0201664 A1 Jul. 1, 2021

(51) Int. Cl.
*G08G 1/00* (2006.01)
*G08G 1/01* (2006.01)
(Continued)

(52) U.S. Cl.
CPC ........... *G08G 1/0125* (2013.01); *B60W 30/09* (2013.01); *B60W 30/0956* (2013.01);
(Continued)

(58) Field of Classification Search
CPC ...... G08G 1/166; G08G 1/095; G08G 1/0125; G08G 1/087; G08G 1/091; G08G 1/0962;
(Continued)

(56) References Cited

U.S. PATENT DOCUMENTS 6,326,903 B1 * 12/2001 Gross ..................... G08G 1/087
340/988
7,994,902 B2 8/2011 Avery et al.
(Continued)

FOREIGN PATENT DOCUMENTS

KR 101276385 B1 6/2013
KR 101338124 B1 12/2013
(Continued)

OTHER PUBLICATIONS

"VRUITS—Improving the safety and mobility of vulnerable road users through ITS applications".SICE. 7th European Framework Programme. Apr. 21, 2020. 8 pages, https://www.sice.com/en/rd/vruits-improving-safety-and-mobility-vulnerable-road-users-through-its.

(Continued)

*Primary Examiner* — Truc M Do
(74) *Attorney, Agent, or Firm* — Vichit Chea; Brooks Kushman P.C.

(57) ABSTRACT

A vehicle that includes controller(s) and components that are coupled with, among other devices and systems, imaging sensors, transceivers, and obstacle and infrastructure detectors, which are configured to detect and predict locations and movements of roadway obstacles, infrastructure features and elements that include, for example, intersections and crosswalks, and positions, movement, and trajectories of pedestrians and other vehicles. Such roadway obstacles may include the other vehicles, pedestrians on and entering the crosswalks and roadway, and other potential obstacles. The controller(s) and device(s) are also coupled to and/or configured trajectory and intersection signal detectors, which detect the roadway obstacles and features such as the pedestrians, other vehicles, intersections, and crosswalks, as well as signals for the roadways and crosswalks. The vehicle controller(s) and device(s) generate and communicate sig- (Continued)

naling changes to the intersection and crosswalk infrastructure controllers, and message alerts that are communicated to the other vehicles.

11 Claims, 3 Drawing Sheets

(51) Int. Cl.
*B60W 30/09* (2012.01)
*B60W 30/095* (2012.01)
*B60W 40/02* (2006.01)
*G08G 1/087* (2006.01)
*G08G 1/09* (2006.01)
*G08G 1/095* (2006.01)
*G08G 1/0962* (2006.01)
*G08G 1/16* (2006.01)

(52) U.S. Cl.
CPC ............ *B60W 40/02* (2013.01); *G08G 1/087* (2013.01); *G08G 1/091* (2013.01); *G08G 1/095* (2013.01); *G08G 1/0962* (2013.01); *G08G 1/161* (2013.01); *G08G 1/164* (2013.01); *G08G 1/166* (2013.01)

(58) Field of Classification Search
CPC ....... G08G 1/161; G08G 1/164; B60W 30/09; B60W 30/0956; B60W 40/02
See application file for complete search history.

(56) References Cited

U.S. PATENT DOCUMENTS

| | | | |
|---|---|---|---|
| 9,558,666 | B2 | 1/2017 | Jansson et al. |
| 9,953,522 | B2 | 4/2018 | Cross et al. |
| 10,771,921 | B2* | 9/2020 | Ueno ..................... G08G 1/005 |
| 2006/0217874 | A1* | 9/2006 | Ueda ....................... G08G 1/07 |
| | | | 701/538 |
| 2013/0138390 | A1* | 5/2013 | Shikatani ............... G01C 21/10 |
| | | | 702/141 |
| 2014/0195138 | A1 | 7/2014 | Stelzig et al. |
| 2016/0027299 | A1 | 1/2016 | Raamot |
| 2016/0027300 | A1* | 1/2016 | Raamot ................ G08G 1/0145 |
| | | | 340/922 |
| 2016/0110998 | A1 | 4/2016 | Todasco |
| 2016/0335892 | A1* | 11/2016 | Okada .................... G08G 1/123 |
| 2017/0018187 | A1* | 1/2017 | Kim ....................... G08G 1/164 |
| 2017/0088040 | A1 | 3/2017 | Williams et al. |
| 2017/0120804 | A1 | 5/2017 | Kentley et al. |
| 2017/0132915 | A1 | 5/2017 | Cross et al. |
| 2020/0074847 | A1* | 3/2020 | Wang ..................... B60Q 1/525 |

FOREIGN PATENT DOCUMENTS

| | | |
|---|---|---|
| KR | 101475453 B1 | 12/2014 |
| WO | 2016195566 A1 | 12/2016 |
| WO | 2017/070373 A1 | 4/2017 |

OTHER PUBLICATIONS

International Search Report of the International Searching Authority for PCT/US2017/057388 dated Jan. 9, 2018.

* cited by examiner

VEHICLE TO VEHICLE AND INFRASTRUCTURE COMMUNICATION AND PEDESTRIAN DETECTION SYSTEM

TECHNICAL FIELD

The disclosure relates to pedestrian detection systems that enable sharing of pedestrian detection data utilizing vehicle to vehicle and vehicle to infrastructure bidirectional communications systems.

BACKGROUND

Vehicle manufacturers have developed various types of in-vehicle and/or on-board computer processing systems that include vehicle control, navigation, vehicle to vehicle and vehicle to infrastructure communications systems, and related messaging capabilities, and various other vehicle related applications. Additionally, such systems sometimes are further enabled to generate, transmit, and receive messages to and from nearby vehicles and roadway infrastructure, which messages can sometimes enhance situational awareness of such vehicles and infrastructure, and which may include vehicle location, velocity, and other data. Opportunities exist for improved situational awareness utilizing additional vehicle sensor information and obstacle detection capabilities, as well as for improved messaging capabilities that can include commands and alerts communicated to roadway signal devices and other nearby vehicles.

SUMMARY

Many types of personal, commercial, and industrial vehicles, including combustion engine and hybrid, plug-in hybrid, and battery electric vehicles, hereafter collectively referred to as "vehicles," include several types of in-vehicle computing systems, controllers, sensors, detectors, interfaces, networks, communications capabilities, and applications. These vehicle controllers, devices, and components enable vehicle operation, as well as on-board and in-vehicle navigation, vehicle to vehicle and vehicle to infrastructure communications, and related communications capabilities, and control and exchange of data between nearby vehicles and roadway or infrastructure systems.

The disclosure is directed to a vehicle that includes at least one and/or one or more controller(s) and components that are coupled with, among other devices and systems, imaging sensors, transceivers, and obstacle and infrastructure detectors. These controller(s) and components(s) are configured to detect and predict locations and movements of roadway obstacles, infrastructure features and elements that include, for example, intersections and crosswalks, as well as positions, movement, and trajectories of a host vehicle that incorporates the controller(s) and other vehicles, and moving obstacles such as pedestrians. These roadway obstacles include the other vehicles, the pedestrians entering or already on the roadway and/or crosswalk, and many other types of potential fixed or moving obstacles, which can include cyclists, animals, debris and side of road utility poles, fire hydrants, and other things that may be positioned about a roadway proximate to traffic lanes.

The vehicle controller(s) and component(s) and device(s) are also coupled to, in communication with, and/or configured as trajectory and intersection signal detectors, which are further modified to detect the roadway and intersection features, the obstacles that may include pedestrians and other vehicles, and the roadway elements including the crosswalks, intersections. Roadway, intersection, and crosswalk signals are also detectable by the vehicle controller(s) and device(s).

These vehicle controller(s) and device(s) are further configured to detect and predict respective and/or relative positions, movement, trajectories, and other information about the obstacles, including for example the pedestrians, cyclists, and other vehicles. In further variations, the vehicle controller(s) and device(s) also are enabled and/or configured to detect and/or generate avoidance zones that surround and/or circumscribe such fixed or moving roadway obstacles, which may include for example the detected crosswalks.

In some arrangements, the avoidance zones may be static or dynamic, and generated to define a perimeter that surrounds the obstacles by a fixed or variable offset of some predetermined distance. The avoidance zone may change positions and surround the one or more of the roadway obstacles and/or the predicted trajectories of the obstacles, according to respective movement thereof.

Other variations include the controller(s) and device(s) configured to detect and respond to the avoidance zone and/or an avoidance zone that includes a pedestrian trajectory proceeding into an intersection and/or crosswalk of a roadway. In modifications, the controller(s) and device(s) coupled to, in communication with, including, and/or configured as a vehicle trajectory detector, which is configured to detect and/or predict one or more of host and other vehicle trajectories, and to detect and/or predict such trajectories intersection the at least one avoidance zones.

In response, the controller(s) and component(s) also detect an intersection and/or crosswalk signal state, and generate a signal change message when the signal state conflicts with the detected and/or predicted vehicle and/or obstacle trajectories, and/or when such trajectories are detected and/or predicted to intersect the avoidance zones. Additionally, the controller(s) are configured to communicate the signal change message to an intersection and/or crosswalk controller.

The signal change message is configured to command and/or enable a signal change and/or an intersection or crosswalk signal state, which responds to and/or which is to be changed according to the detected/predicted vehicle and obstacles trajectory(ies). This message also includes in some arrangements, an intersection alert request and/or command that enables or commands the intersection controller to generate an audiovisual alert according to the pedestrian trajectory, in addition to changing the signal and/or signal state to respond to the trajectory(ies).

The intersection audiovisual alert utilizes the existing signaling and sound capabilities of the intersection infrastructure, and can also include and/or incorporate additional audiovisual annunciation equipment. The disclosure also contemplates the controller(s) and device(s) modified to generate an external vehicle audiovisual alert utilizing existing, supplemental, and/or augmented vehicle lighting and sound to alert nearby pedestrians and other vehicles.

The controller(s) and component(s) of the vehicle are also configured to generate a trajectory alert message, which includes vehicle and obstacles position and trajectory information, and other data, which is communicated to one or more of the intersection controller and the one or more other vehicles. Such vehicle controller(s) and device(s), including the pedestrian and vehicle trajectory, intersection, and crosswalk detectors are also configured in modified variations to detect at least one of a crosswalk traversing a roadway or intersection, and a crosswalk signal state, and the at least one avoidance zone circumscribing obstacles detected in the vehicle trajectories. Such an avoidance zone may also be generated that surrounds the entire the crosswalk feature of an intersection or other roadway location.

In response, the controller(s) and device(s) also detect the crosswalk signal state, in response to previously detecting the pedestrian trajectory proceeding into the crosswalk. If the crosswalk signal state conflicts with the detected pedestrian trajectory, then the vehicle controller(s) and device(s) generate the signal change message, and communicate it to the intersection controller, to command and/or enable at least one of intersection and/or crosswalk signal and/or state changes responsive to the detected pedestrian trajectory.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
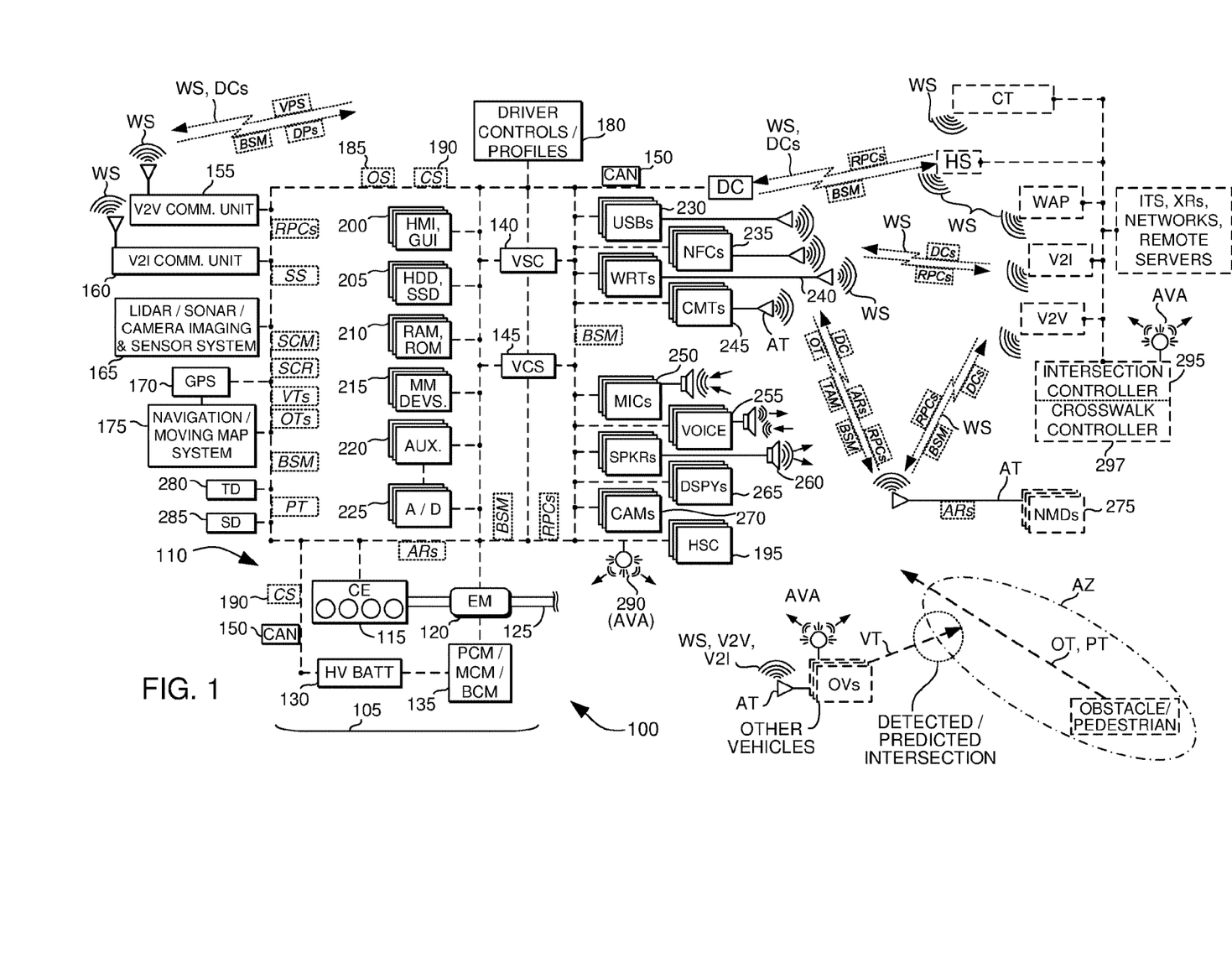
FIG. 1 is an illustration of a vehicle and its systems, controllers, components, sensors, actuators, and methods of operation.
Figures 2, 3:
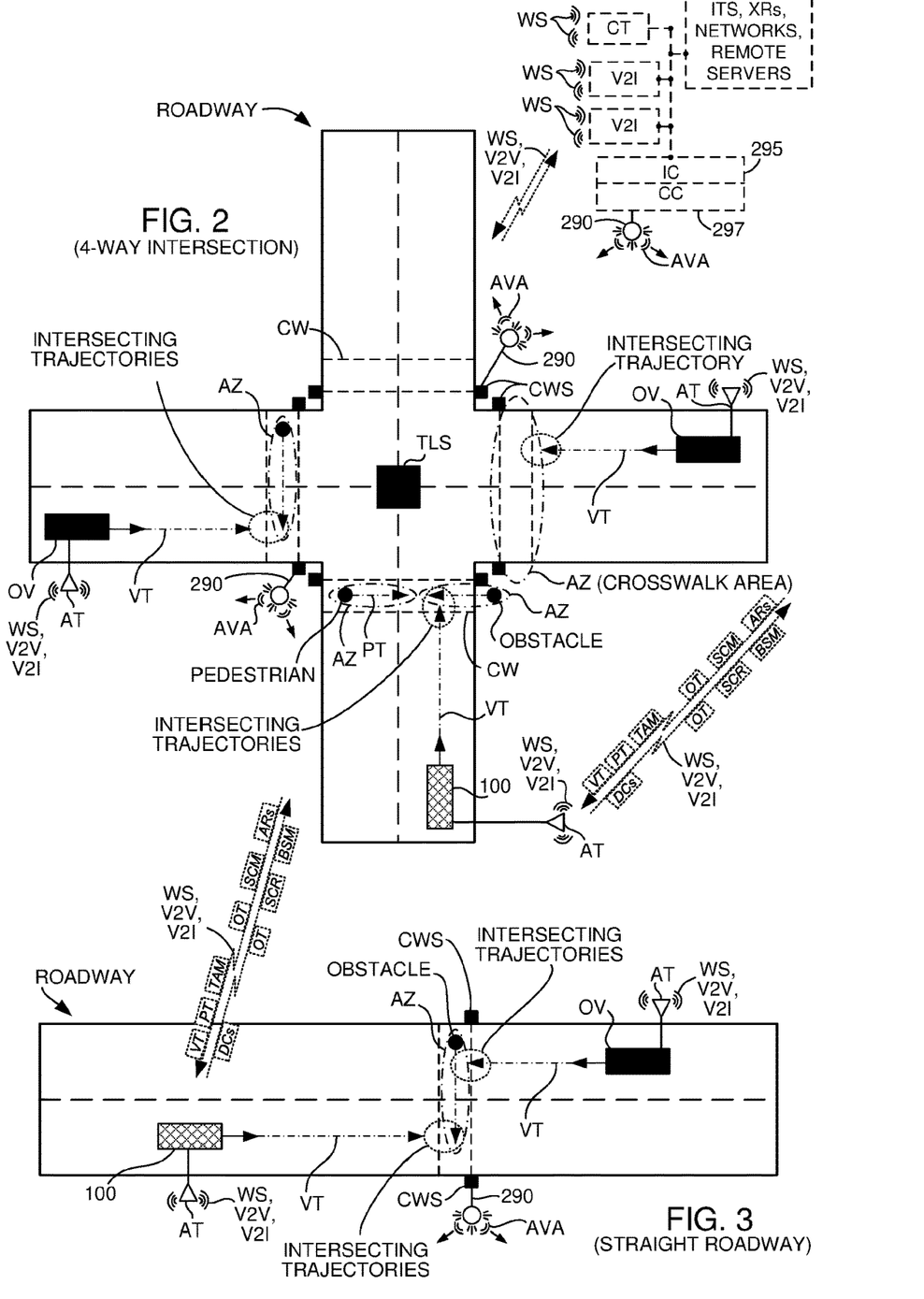
FIG. 2 illustrates certain aspects of the disclosure depicted in FIG. 1, with components removed and rearranged for purposes of illustration.
FIG. 3 illustrates additional features and capabilities of the vehicle and devices illustrated in FIGS. 1 and 2, having various elements added, modified, and adjusted to further describe features of the disclosure.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and/or that may be incorporated as part of a vehicle system controller (VSC) 140 and a vehicle computing system (VCS) and controller 145, which are in communication with PCM/MCM/BCM 135, and other controllers. For example, in some configurations for purposes of example but not limitation, VSC 140 and/or VCS 145 is and/or incorporates the SYNC™, APP-LINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink.com, openXCplatform.com, www.ford.com, U.S. Pat. Nos. 9,080,668, 9,042,824, 9,092,309, 9,141,583, 9,141, 583, 9,680,934, and others).

In further examples, SmartLinkDevice (SDL), OpenXC, and SYNC™ AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing in-vehicle or on-board HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUIs, and also may include utilization of on-board or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), vehicle area networks (VANs), wide area networks (WANs), peer to peer (P2P), vehicle to vehicle (V2V), and vehicle to infrastructure and infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V) 155, and vehicle to roadway infrastructure to vehicle communication system (V2I) 160, a LIDAR/SONAR (light and/or sound detection and ranging) and/or video camera roadway proximity imaging and obstacle sensor system 165, a GPS or global positioning system 170, and a navigation and moving map display and sensor system 175, among others. As used here, GPS is typically referred to as the United States GPS system, but also is intended in this disclosure to generically also refer to and include other positioning systems, including for example the Russian GLONASS, Globalnaya Navigazionnaya Sputnikovaya Sistema, or Global Navigation Satellite System (GNSS), as well as the European Galileo and China BeiDou GNSSs, among others.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V 155 and V2I 160 (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

Such aspects include for purposes of example but not for limitation, United States (U.S.) Department of Transportation Intelligent Transportation System (ITS) standards available at www.standards.its.dot.gov and www.its.dot.gov, and which include the Connected Vehicle Reference Implementation Architecture (CVRIA), local.iteris.com/cvria/.

The U.S. National Highway and Transportation System Administration (NHTSA) www.nhtsa.gov has developed additional refinements that include basic safety message protocols and formats described in various resources available at www.nhtsa.gov/technology-innovation/vehicle-vehicle-communications, and which also include various NHTSA reports, such as for example report no. DOT HS 812 014 entitled "NHTSA: Vehicle-to-Vehicle Communications: Readiness of V2V Technology for Application," www.nhtsa.gov/staticfiles/rulemaking/pdf/V2V/Readiness-of-V2V-Technology-for-Application-812014.pdf, report no. DOT HS 811 492A entitled "Vehicle Safety Communications—Applications (VSC-A)," available from www.nhtsa.gov/DOT/NHTSA/NVS/Crash Avoidance/Technical Publications/2011/811492B.pdf and report no. DOT HS 081 514 entitled "Federal Motor Vehicle Safety Standards: Vehicle-to-Vehicle (V2V) Communications, Docket No. NHTSA-2014-0022," available from www.nhtsa.gov/staticfiles/rulemaking/pdf/V2V/V2V -ANPRM_081514.pdf. Many of and related documents and reports are also available from the U.S. Government Printing Office located at www.gpo.gov.

Such protocols, standards, and/or messaging formats are also enabled by various other organizations and resources, including for example many European reports, such that entitled "Directive 2010/40/EU on the framework for the deployment of Intelligent Transport Systems in the field of road transport and for interfaces with other modes of transport," which is available at eur-lex.europa.eu/legal-content/EN/ALL/?uri=CELEX%3A32010L0040, and another report entitled "C-ITS Deployment Platform—Final Report, January 2016," available at ec.europa.eu/transport/themes/its/doc/c-its-platform -final-report-january-2016.pdf.

A number of international standards organizations are also involved in the field of technology and have generated various V2X resources such as the Society of Automotive Engineers International™ (SAE) telematics and related standards J2945 and J2735: "On-Board System Requirements for V2V Safety Communications Standard," SAE J2945/1_201603, standards.sae.org/j2945/1_2016031, and "Dedicated Short Range Communications (DSRC) Message Set Dictionary Standard," SAE J2735_201603, standards.sae.org/j2735_201603, and others available from topics.sae.org/telematics/standards/automotive.

The messages for V2V applications are defined in, among other references, SAE J2735 as the Basic Safety Message(s) (BSMs, BSM-II) parts 1 and 2. The disclosure recites BSM and BSM-II messaging capabilities interchangeably and contemplates that extended data and information capabilities enabled by the BSM-II standards are referred to in every instance herein where BSM is recited. The SAE 2735 BSM capabilities support and enable wireless communication between vehicles and/or between vehicles and fixed or nomadic devices, including roadway, intersection, and other infrastructure devices and systems (V2I).

Such roadway infrastructure includes, for example without limitation, traffic and pedestrian signaling, vehicle identification, automated toll collection, traffic lane direction changing systems, among others, and related management and communications V2I systems. The SAE J2735 standard describes, defines, and specifies messages and data elements that make up messages/dialogs specifically for use by vehicle, roadway infrastructure, and other off-board applications that utilize 5.9 gigahertz (GHz) DSRC for Wireless Access in Vehicular Environments (WAVE) communications systems.

The current J2735 standard describes requirements for using the BSM for V2V safety applications. The SAE J2945 standard describes communication performance requirements of the DSRC Message sets and the BSM data elements that support V2V and V2I safety applications. Such WAVE communications and related systems are described in more detail in various reports established by and available from the Institute of Electrical and Electronics Engineers (IEEE) as described below. See, for example, standards.ieee.org, and more specifically, IEEE standard 1609, entitled, "Guide for Wireless Access in Vehicular Environments (WAVE) Architecture," which is available from standards.ieee.org/develop/wg/1609_WG.html.

The IEEE 1609 WAVE standards enable and define an architecture and a standardized set of communications services and interfaces that enable secure V2V and V2I wireless communications. These standards enable a range of transportation and navigation applications, including vehicle safety, automated tolling, enhanced navigation, and traffic management, among others. The IEEE 1609 Wave capabilities are utilized in conjunction with others directed to various aspects of network and communications standards and architectures, including those managed by the IEEE 802 local area network and metropolitan area network (LAN/MAN) standards committee, which can be found at www.ieee802.org, as well as standards.ieee.org.

IEEE Standards 802.11 support software and firmware communications services of IEEE 1609, and are enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

These technology-enabling standards have many variations that enable additional capabilities for specific applications, including for example automotive network communications to support Intelligent Transportation Systems (ITS) applications, including data communications between vehicles and between vehicles and transportation infrastructure in the ITS frequency band surrounding 5.9 GHz (5.85-5.925 GHz).

IEEE Standard 802.11p is an amendment to 802.11 that enables and define wireless communications supporting IEEE 1609, which further enable automotive and transportation and roadway infrastructure system applications (V2I), including LANs, WANs, PANs, and peer to peer or V2V networks and data communications that are also referred to as "V2x" or vehicle to vehicle and vehicle to everything. IEEE 802.11p is entitled in part "Wireless LAN Medium Access Control (MAC) and Physical Layer (PHY) Specifications: Amendment: Wireless Access in Vehicular Environments (WAVE)," and is available from ieeexplore.ieee.org/document/5514475/.

VSC 140, VCS 145, and/or other controllers, devices, and processors according to the disclosure are enabled by and incorporate such V2x, V2V, and V2I technologies and capabilities, and also utilize various additional technologies to determine and establish absolute and relative positioning and navigation of vehicle 100. For further example, various absolute and relative positioning technologies contemplated for utilization in the disclosure include the GPS and GNSS systems described above and also include Wide Area Augmentation Systems (WAAS), and Real Time Kinematics (RTK) systems, which can be understood by those skilled in the art with reference to the various standards, specifications, architectures, and related information described herein.

WAAS is an augmented GPS and GNSS that uses supplemental ground reference stations to measure deviations from GPS and GNSS positions and to enable corrections in the continental United States. RTK systems enable positional accuracy improvements using the difference in the phase of GPS and GNSS signals two fixed or moving reference stations. Such accuracy improving capabilities can enable position accuracy with resolutions of up to a few centimeters.

These and related capabilities can be understood from and obtained in a number of the preceding references, and also in a U.S. NHTSA report by the VSC 2 Consortium, entitled "Vehicle Safety Communications—Applications (VSC-A) Final Report: Appendix Volume 2 Communications and Positioning," Report No. DOT HS 811 492C, 9/2011, available from www.nhtsa.gov/Research/Crash+Avoidance/Office+of+Crash+Avoidance+Research+Technical+Publications.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data.

Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, and/or various others. For example, the controllers may establish bidirectional communications with such internal and external sources, and communicate control commands, logic, and instructions and code, data, information, and signals to and/or from engine 115, EM 120, batteries 130, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 185, and control or command signals (CS) 190 received from and sent to and between controllers and vehicle components and systems, either over wired and/or wireless data and signaling connections. OS 185, and CS 190, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIGS. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs) 195, which further refer to, incorporate, and include buttons, and/or switches, and steering wheel controls and buttons (SWCs), instrument cluster and panel hardware and software buttons and switches, and GUI display software switches and controls, among other controls In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth™" devices, that enable wireless personal and local area networks (WPANs, WLANs) or "WiFi" IEEE 802.11 and 803.11 communications standards.

The controller(s) and devices(s) of vehicle 100 are also coupled with, incorporate, and/or include analog and digital cellular network modems and transceivers (CMTs) 245 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, nomadic and mobile devices (NMDs) 275, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs 195, and may also include, incorporate, and/or be integrated with and/or as part of GUI 200 and the contemplated hardware and software SWCs, controls, buttons, and/or switches 195. Such HSCs 195, as already noted, may be hardware or software or combinations thereof and may be configurable utilizing one or more predetermined, default, and adjustable factory and/or driver controls, profiles, and/or preferences of repository 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS and GNSS devices, and similar devices and components that each may include integrated transceivers and antennas AT, wired and plugged connectors DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WS, with external near and far nomadic, portable, and/or mobile devices 275, networks, and systems (V2X) that may include, for example, other vehicles (OVs via V2V communications), roadway and infrastructure communications systems (V2I) such as hot-spots and wireless access points (HS/WAPs), nano and micro and regular cellular access points and towers (CT), external routers (XRs), and related and accessible external, remote networks, systems, and servers.

With continuing reference to the various figures, including FIGS. 1, 2, 3, and 4, it may be understood by those with knowledge in the relevant fields of technology that the disclosure contemplates vehicle 100 to include at least one and/or one or more controller(s) such as VSC 140, VCS 145, and others coupled with an in-vehicle or on-board transceiver AT, such as those described in connection with USBs 230, NFCs 235, WRTs 240, and/or CMTs 245. The controller(s) 140, 145 and transceiver(s) AT are configured to detect WSs and connect to nearby or proximate or far wired and wireless network devices having in-range WSs, as well as third-party, off-board, external devices such as nomadic, portable, and/or mobile or nomadic mobile devices 275.

Vehicle 100 also includes the various controller(s) such as VSC 140, VCS 145, and others coupled to, in communication with, to include, and/or be configured as pedestrian and vehicle trajectory detectors (TDs) 280, intersection and crosswalk signal detectors (SDs) 285, as well as one or more and/or at least one imaging device and transceiver. The contemplated imaging device(s) is/are camera imaging and sensor system, 165, and may include additional and/or other imaging sensors configured for visual and non-visual spectral, acoustic, radar, and other imaging technologies and frequency ranges suitable for purposes of enabling roadway infrastructure and obstacle imaging and detection.

The contemplated transceiver(s) are any of the communications units already described, and include or may include as examples but not for purposes of limitation, V2V 155, V2I 160, WRTs 240, CMTs 245, and others. Vehicle 100 also includes one or more audiovisual alert devices 290, which may consist of and/or include a horn or other external audio device, the vehicle headlights, turn signals, brake lights, and which may also include other audiovisual alert devices 290 that can be utilized by vehicle 100 to generate a variety of external audiovisual signals and alerts AVAs.

The TDs 280 are configured to detect a moving obstacle or vehicle, which obstacles can include a pedestrian or other person or thing moving about the intersection and/or a crosswalk CW (FIGS. 2 and 3), and to detect and/or predict a trajectory for the obstacle (OT), pedestrian/person (PT) and/or vehicle (VT). TDs 280 in some configurations utilize static and dynamic GPS and GNSS information for host vehicle 100, as well as similar data received from OVs via V2I BSMs. TDs 280 and SDs 285 in some configurations are also coupled with the imaging sensors such as LIDAR/SONAR/camera imaging and sensor system 165, and/or other controller(s) and sensors, and are alone and/or in combination configured to capture images from the imaging sensors 165. TDs 280, SDs 285, imaging sensors 165, and/or other controllers are configured to analyze the captured images to detect a host vehicle trajectory (VT), trajectories of other vehicles OVs.

The images are also analyzed to detect roadway and infrastructure features that include traffic lanes, roadside emergency lanes, curbs, utility poles and boxes, overhead and roadside signs having symbols and text, roadway intersections, crosswalks CWs, signal light illumination and colors and symbols and text, and traffic and crosswalk light signals TLS, CWS and signal states for such intersections and crosswalks, among other roadway features and elements. Such roadway intersection and crosswalk signals CWS and signal states (SS) are also detected by SDs 285, by utilizing V2I communication unit 160 to monitor and detect such signals and states from messages communicated by intersection controllers IC 295 that may have integrated or that may be coupled with crosswalk controllers 297, and ITS roadway infrastructure V2I communications systems.

During operation of vehicle 100, pedestrian TDs 280 communicate with imaging sensor(s) 165 to detect and identify, among other things, intersections, crosswalks CWs, and/or obstacles in and around the roadway. Such obstacles include moving pedestrians, including cyclists, persons in a wheelchair or on a scooter or other moving device, and/or perhaps animals large enough to be detectable, and other moving obstacles. If imaging sensors 165 and/or pedestrian TDs 280 discriminate and detect a moving pedestrian or other person from collected roadway image data, then pedestrian trajectory PT is detected and/or predicted, to determine the direction and speed of the moving pedestrian or person. Similarly, vehicle trajectories (VTs) for a host vehicle, such as vehicle 100, and other vehicles (OVs) are detected and/or predicted by TDs 280.

With detected intersection and/or crosswalk image data, TDs 280 and sensors 165 are further configured to detect and/or predict whether PT is in and/or is proceeding into the intersection and/or crosswalk CW. If so, TDs 280 and sensors 165 are further configured to detect the intersection and/or crosswalk signal state SS. The signals and signal states of the intersection and crosswalk CW may be changed between different colors, and may also include a number of configurations or intersection signal states SS.

For purposes of this disclosure, the phrase "signal changes" refers to extinguishing and illuminating one or more different, individual colored lights facing and signaling to traffic moving in a particular direction of the roadway. The phrase "signal states" SS refers to changing the signaling configuration of all lights incorporated in a particular traffic signal for all directions of roadways entering and exiting the intersection.

Intersection signals in the United States are often referred to as traffic lights, traffic signals, traffic control systems, and combinations thereof. Such traffic light signals TLS (FIG. 2) include multicolor lights and often also include audio annunciation components that may generate sound signals at a volume that can be heard by people proximate the intersection, as well as in some cases at a volume that can also be heard by vehicles transiting the intersection. Such multicolor lights as utilized in U.S. intersection traffic control systems, usually cycle from green, to yellow, and then red, and have each set of green-yellow-red lights facing and visible to each individual direction of roadway the enters and exits the intersection.

Other countries and signaling systems utilize other colors, and also use vertical, horizontal, and diagonal illuminated bars and other lighted or illuminated traffic signaling symbols, which bars or symbols are cycled to signal and control the flow of traffic about roadways. For purposes of example in this disclosure, the green-yellow-red multicolor traffic control lights will be used. In the continuing example, the red light indicates traffic and persons must stop, the green light indicates all may proceed, and the yellow light briefly warns all to slow and prepare to stop at the imminent red light that follows.

Each such traffic light signal TLS typically includes at least one set of three lights, one light for each of green, yellow, and red colors, and having at least one set facing or projecting light illumination towards a single direction of the roadway. For an intersection having two crossing or intersecting roadways, such as a north-south roadway and an east-west roadway, which is often referred to as a "four-way" intersection, such a traffic light signal would include at least four sets of three lights each, with one set facing each of north, south, east, and west. Additional sets may be included having illuminated, colored, directional arrows, that enable turn lane signaling and other traffic control signaling capabilities.

These traffic light signal sets are each controllable by intersection controller IC 295, which is typically configured to command and enable illumination of each individual light in the sets of three green, yellow, and red lights. For further example, intersection controller may change the traffic signaling by extinguishing and illuminating different colored lights in each set to cycle between green, yellow, and red over a specified time period, and may generate visual signals in the directions of the respective intersection roadways, which annunciate specific traffic control commands, such as flashing red or yellow lights, concurrently flashing red and yellow lights together.

Further, IC 295 control the intersection traffic light signal states SS, by changing the light signaling configuration of all of the lights in each set concurrently. For example, intersection SS may be cycled by IC 295, wherein each set of the four sets in this example are cycled between the green-yellow-red sequences, such that north-south traffic may be signaled to stop beyond a perimeter of the intersection, with red lights illuminated in each direction. Simultaneously, east-west traffic can be controlled and signaled to proceed through the intersection, with IC 295 signaling the east-west facing green lights being illuminated.

IC 295 can also change signal state SS of the intersection by reversing the stop and proceed traffic signaling in the north-south and east-west directions. For further example, IC 295 may cycle the east-west facing lights to extinguish the green lights while illuminating the yellow lights for a short period, followed by extinguishing the yellow lights while illuminating the red lights. Then, IC 295 may cycle the north-sought signaling by extinguishing the red light while illuminating the green light.

IC 295 may also change the intersection signal state to stop all traffic by continuing to illuminate the red lights currently signaling one roadway direction, while also extinguishing the green lights facing another roadway direction while illuminating the yellow lights for the brief period, followed by extinguishing the yellow lights while illuminating the red lights, such that red lights are signaling all directions of the intersection. In further variations, the IC 295 may also be configured to generate and/or annunciate visual alerts to vehicles and people near the intersection, by concurrently flashing the yellow lights of each set in all directions while the red lights remain illuminated, and/or flashing both the red and yellow lights in all directions concurrently. Such traffic lights may also be augmented with additional lights, colors, and symbols to enable additional visual alerting capabilities.

In further variations, IC 295 is also configured to command and control the audio annunciation systems that may be incorporated into the intersection signaling traffic control system. When the IC 295 commands the traffic light to generate and/or annunciate the visual alerts, it may also command the audio annunciation system(s) to generate and/or annunciate an audio signal, such the IC 295 generates and commands a combined audiovisual alert AVA.

IC 295 also includes, incorporates, is configured as, and/or is coupled to or in communication with a crosswalk controller CC 297, which is configured to control and command one or more crosswalk signals CWS that include one or more illuminated crosswalk signs and/or audio signaling devices CWSs. These signs and signaling devices are positioned about the intersection adjacent to crosswalk areas CW, which areas can include one or more lines, symbols, words, lights, and walkways painted, etched, and incorporated into and about the roadway, and which are visibly and audibly perceptible to those near the intersection and utilizing the crosswalk area CW.

Such signs and signaling devices are typically also positioned in a direction that is perceptible to those moving from one side of the roadway to another when moving across a section of the roadway and/or the intersecting roadways. Such crosswalks CWs may also be included about straight sections of a roadway in locations where there are no nearby intersection crosswalks. In these latter configurations, such non-intersection crosswalks CWs (FIG. 3) may typically include only CC 297 configured to control both CWSs and any traffic light signal TLS that may be utilized, since intersection controller 295 may be unneeded in some applications.

Such crosswalk signs and signals CWS have many configurations that may include for purposes of example, illuminated signal lights that annunciate symbols and/or words such as "walk" and "stop". Such crosswalk signals CWS also typically include audio signaling and annunciation devices, such as audiovisual alert devices 290 that are configured to generate AVAs that announce "walk" and "stop" in a native language, as well as various other audio beeps, chirps, and other sounds that communicate commands to those around the intersection and the crosswalk. The intersection and/or CC 297 also include the ITS V2I communications technology and devices described elsewhere herein.

One or more of intersection controller 295 and CC 297 are configured to also command and control the crosswalk visual and audio signaling CWS to correspond with the traffic signaling TLS and signal states. Similar to the roadway traffic control signals, the CC 297 is configured to change individual crosswalk signs CWSs, as well as to change a crosswalk signal state SS for entire intersection having multiple crossing or intersecting roadways, so as to correspond with the roadway traffic signaling. For example, CC 297 may illuminate the crosswalk signs CWS to annunciate "walk" to signal pedestrians and others to cross the roadway, when roadway traffic is stopped at a red light.

In contrast, CC 297 will illuminate the crosswalk sign to annunciate "stop" or some other similar signal, during a green traffic light signaling traffic to proceed along the roadway and across and through the crosswalk. In other arrangements, CC 297 may annunciate the "stop" visual sign and audio signal, or another audiovisual symbol, sound, and/or signal, to generate a combined audiovisual alert AVA in other circumstances. Further, crosswalk controller CC 297 may be controlled by and/or part of intersection controller 295 such that cross walk signs and audio signaling is commanded by intersection controller 295.

If the PT is detected in and/or predicted to proceed into the intersection, then the vehicle controller(s) and device(s), such as TD 280, SD 285 detect the intersection SS. TD 280, SD 285 and/or other controller(s) and device(s) detect the intersection SS either by V2I communication unit 160 communicating with intersection IC 295 and/or CC 297, or by detecting traffic light signals TLSs and/or crosswalk signals CWS that are visible to imaging sensors 165, or both.

When the detected the PT direction is in and/or predicted to proceed into the intersection and/or crosswalk CW, and is further detected to conflict with the intersection and/or crosswalk signal state SS, then the controller(s) and device(s), such as TD 280, SD 285 and/or other controllers generate at least one of a signal change message (SCM), which may also incorporate a generated intersection state change request (SCR), and communicate the SCM and/or SCR to intersection and/or crosswalk controllers 295, 297 to enable a signal and/or signal state change responsive to the trajectory.

TD 280, SD 285 and/or the other controller(s) and device(s) of vehicle 100 are configured to detect the conflict(s) when the PT is in and/or proceeding into the intersection and/or cross-walk CW, when the traffic light signals are signaling traffic to proceed through the intersection and/or cross-walk CW, and/or when the crosswalk signals CWS are signaling pedestrians and other crosswalk users to "stop" or otherwise not cross the roadway.

In response, the generated SCM and SCR are communicated to IC 295 and/or CC 297 as and/or with commands or requests to change the intersection traffic light signals TLS, cross-walk signals CWS, and/or signal states. Commanding changes to the signals and signal states enables the ITS-enabled intersection to signal vehicles 100, OVs, that are moving towards and through the crosswalk CW and/or intersection area adjacent to the PT, as well as to signal and alert the pedestrians and others causing the PT, OT, VT conflict(s). Typically, the disclosure contemplates the SCM and/or SCR to be generated and included as part of the ITS V2I BSM messages, and other message formats described elsewhere herein (OpenXC, OBD, etc.), which are communicated from vehicles to the ITS roadway infrastructure, such as intersection and crosswalk controllers 295, 297.

In further modifications, TD 280, SD 285 and/or other controllers are also configured to generate and/or detect one or more and/or at least one avoidance zone AZ, which circumscribes obstacles and roadway features that are detected in the path of host and other VTs, Such avoidance zones AZ may take various forms and are in one configuration as depicted in FIGS. 1, 2, and 3, electronic two-dimensional perimeters generated and maintained around the circumscribed fixed or moving obstacles, and/or crosswalks CW.

As may be understood by those skilled in the technology with continuing reference to FIGS. 1, 2, and 3, AZs create a buffer zone of some predetermined distance around the detected roadway obstacles and features, which enables the controller(s) of vehicle 100 such as the host vehicle to identify portions of the roadway that should be avoided to ensure uninterrupted movement of vehicle 100 and OVs about the roadway and around such obstacles and roadway features. Further, AZs enable such vehicles to decelerate and stop and/or avoid such obstacles and roadway features well in advance of and without interference.

In these arrangements, the various controller(s) of vehicle 100 are configured to detect the predicted trajectory of host vehicle 100 and one or more other vehicles OVs intersecting the at least one avoidance zone AZ, which includes the obstacle trajectory OT and/or pedestrian trajectory PT. In response, the controller(s) are further configured to generate the external AVA utilizing the external vehicle audiovisual alert device 290. In other modifications, the vehicle 100 controller(s) also are configured to generate SCM and SCR embedded in and/or as part of ITS V2I BSM messages.

In additional variations, the controller(s) are also configured to generate and embed intersection and/or crosswalk alert requests (ARs) and/or commands that enable intersection and/or crosswalk controllers 295, 297 to generate the AVAs according to OTs and/or PTs. The ARs are configured to command ITS intersection and crosswalk controllers 295, 297 to generate the AVAs, utilizing the ITS intersection audiovisual alert AVA capabilities. Such ITS intersections also include in some configurations audiovisual alerts devices 290 and similar audiovisual augmentation devices and systems. In other arrangements, ARs may also be communicated by V2V and V2I communication units and other controllers directly to NMDs 275 to generate additional AVAs that alert users of host vehicle 100 and OVs who may be in communication with vehicle 100, OVs, and/or the ITSs.

In further modifications of vehicle 100, the controller(s) are also configured to respond to detecting the predicted trajectory(ies) of the one or more OVs intersecting the at least one AZ, which includes the OTs and/or PTs, pedestrian trajectory, and to generate and communicate a trajectory alert message TAM, to the one or more other vehicles, which TAM may be embedded in V2V and V2I BSMs. Additionally, the controllers of vehicle 100 are also configured to communicate via V2I communication unit 160 one or more BSMs that include TAM, SCM, SCR, and intersection and crosswalk ARs, to one or both of the intersection and crosswalk controller 295, 297.

Figure 4:
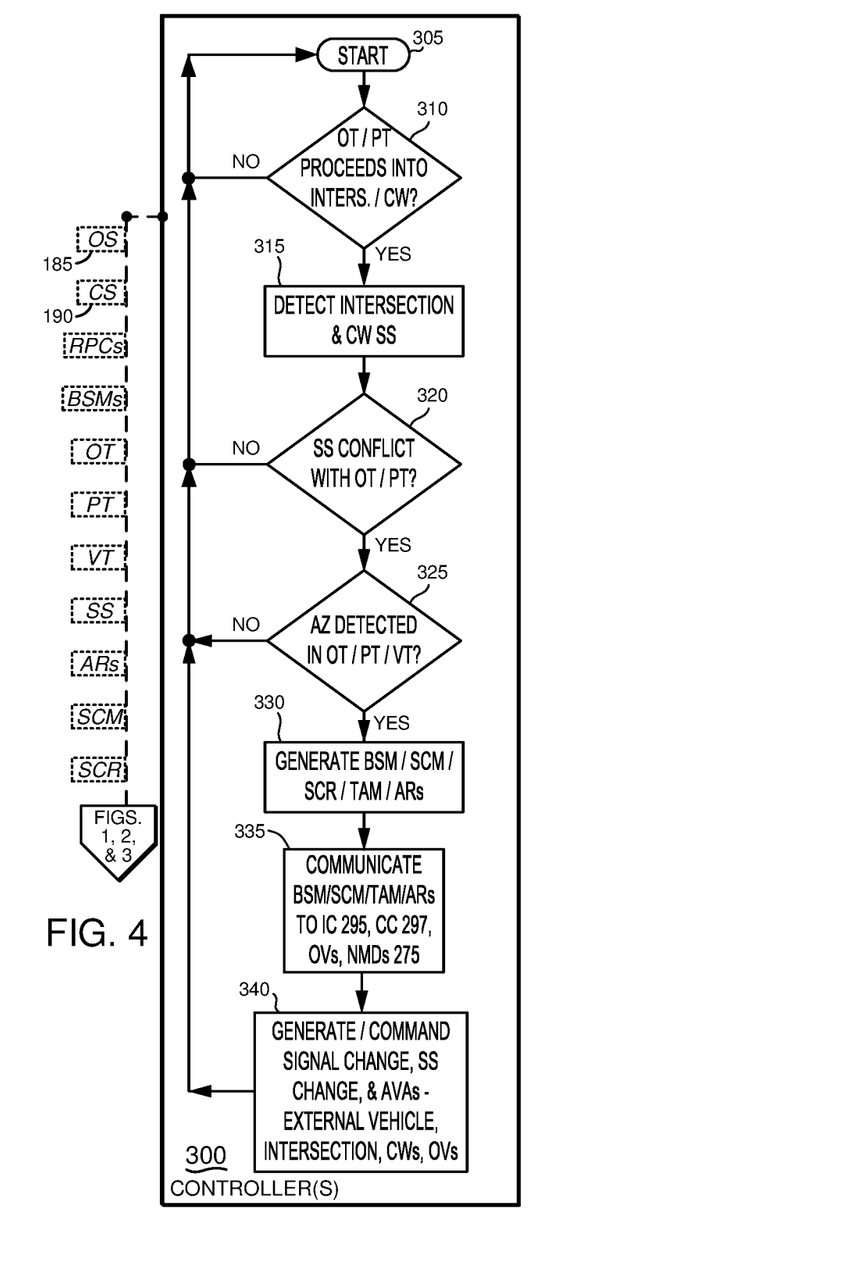
FIG. 4 illustrates other aspects of methods according to the disclosure of the preceding figures.

With continuing reference to FIGS. 1, 2, and 3, the disclosure may be further understood with reference now also to FIG. 4. The various controllers, including for example without limitation VSC 140, VCS 145, TD 280, SD 285, and/or other controller(s), denoted generally by reference numeral 300 in FIG. 4, are also configured to enable the described capabilities as methods of operation. The controller(s) 300 initiate operation at step 305 of FIG. 4, and at step 310, continue with detecting and/or predicting whether OT and/or PT proceed into an intersection and/or CW. If not, controller returns to start step 305 for continued monitoring, and if the detected/predicted trajectories OT and/or PT proceed into intersection and/or CW, then at step 315, the controller(s) 300 continue with detecting SS of intersection and/or CW.

With the SS having been detected at step 315, the controller(s) continue at step 320 with detecting whether the detected SS of intersection and/or CW conflicts with OT and/or PT. If not, then control returns to start step 305 for continued monitoring. Otherwise, control proceeds to step 325, and controller(s) 300 generate and/or detect whether AZ is predicted to be and/or detected to be in either of the OT, PT, and/or VT. If not, control again returns to start step 305 for continued monitoring. But if the generated and/or detected AZ is detected to be in the respective paths of OT, PT, and/or VT, then control proceeds to step 330, and controller(s) 300 generate one or more of basic safety messages to include at least one of and/or one or more of SCM, SCR, TAM, and/or ARs.

Control proceeds then to step 335 where the controller(s) 300 communicate the generated messages, which may be communicated individually and independently, and/or as part of the V2V and/or V2I BSMs, to intersection controller IC 295, crosswalk controller CC 297, OVs, and/or NMDs 275, among other devices, systems, and components of the disclosure. According to such communicated SCMs, SCRs, TAMs, and/or ARs, and specific configurations of ITS intersections and CWs, and/or OVs, the controller(s) 300 also are configured to pass control to step 340 wherein the controller(s) 300, command, request, and/or generate, according to the detected and predicted trajectories OT, PT, VT, signal changes, SS changes, and/or AVAs. Such commanded, requested, and/or generated AVAs are enabled utilizing one or more audiovisual alert devices 290, external to host vehicle 100, and for ITS enabled intersections, CWs, and/or OVs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a controller configured to
couple to pedestrian trajectory and intersection signal detectors, and at least one imaging device and transceiver, and
responsive to detecting a pedestrian trajectory that proceeds into an intersection, detect an intersection signal state of crosswalkintersection infrastructure, generate a signal change message that prompts the pedestrian to GO when the signal state is prompting the pedestrian to STOP, and communicate the signal change message to an intersection controller to command a signal change of the crosswalk infrastructure from STOP to GO.

2. The vehicle according to claim 1, comprising:
the controller further configured to
couple to a vehicle trajectory detector configured to predict a host vehicle trajectory and at least one avoidance zone, and
in response to detecting the vehicle trajectory intersecting the at least one avoidance zone that includes the pedestrian trajectory, generate an external vehicle audiovisual alert.

3. The vehicle according to claim 1, comprising:
the controller further configured to
couple to a vehicle trajectory detector configured to predict a hest vehicle trajectory and at least one avoidance zone, and
in response to detecting the vehicle trajectory intersecting the at least one avoidance zone that includes the pedestrian trajectory, generate the signal change message to include an intersection alert request that enables the intersection controller to generate an audiovisual alert according to the pedestrian trajectory.

4. The vehicle according to claim 1, comprising:
the controller further configured to
couple to a vehicle trajectory detector configured to predict a trajectory of one or more other vehicles and at least one avoidance zone, and
in response to detecting the predicted trajectory of the one or more other vehicles to intersect the at least one avoidance zone that includes the pedestrian trajectory, generate an external vehicle audiovisual alert.

5. The vehicle according to claim 1, comprising:
the controller further configured to
couple to a vehicle trajectory detector configured to predict a trajectory of one or more other vehicles and at least one avoidance zone, and
in response to detecting the predicted trajectory of the one or more other vehicles intersecting the at least one avoidance zone that includes the pedestrian trajectory, generate a trajectory alert message and communicate the trajectory alert message to the one or more other vehicles.

6. The vehicle according to claim 1, comprising:
the controller further configured to
couple to a vehicle trajectory detector configured to predict a trajectory of one or more other vehicles and at least one avoidance zone, and
in response to detecting the predicted trajectory of the one or more other vehicles intersecting the at least one avoidance zone that includes the pedestrian trajectory, generate the signal change message to include an intersection alert request, and communicate the signal change and intersection alert message to the intersection controller to command one or more of an intersection state change and an audiovisual alert.

7. A vehicle comprising:
a controller configured to
couple to pedestrian trajectory and intersection crosswalk detectors, and at least one imaging device and transceiver, and
responsive to detecting a pedestrian trajectory that proceeds into a crosswalk, detect a crosswalk signal state of crosswalk infrastructure, generate a signal change message that prompts the pedestrian to GO when the signal state is prompting the pedestrian to STOP, and communicate the signal change message to a crosswalk controller to command a signal change of the crosswalk infrastructure.

8. The vehicle according to claim 7, comprising:
the controller further configured to generate the signal change message to include a crosswalk state change request that enables the crosswalk controller to command a crosswalk signal state according to the pedestrian trajectory.

9. The vehicle according to claim 7, comprising:
the controller further configured to
couple to a vehicle trajectory detector configured to predict trajectories of a host vehicle and one or more other vehicles, and generate at least one avoidance zone, and
in response to detecting the predicted trajectories intersecting the at least one avoidance zone that includes the pedestrian trajectory, generate an external vehicle audiovisual alert.

10. The vehicle according to claim 7, comprising:
the controller further configured to
couple to a vehicle trajectory detector configured to predict trajectories of a host vehicle and one or more other vehicles, and detect at least one avoidance zone, and
in response to detecting the predicted trajectories intersecting the at least one avoidance zone that includes the pedestrian trajectory, generate the signal change message to include a crosswalk alert request that enables the crosswalk controller to generate an audiovisual alert according to the pedestrian and vehicle trajectories.

11. The vehicle according to claim 7, comprising:
the controller further configured to
couple to a vehicle trajectory detector configured to predict trajectories of a host vehicle and one or more other vehicles, and generate at least one avoidance zone, and
in response to detecting the predicted trajectories intersecting the at least one avoidance zone that includes the pedestrian trajectory, generate the signal change message to include a crosswalk alert request, and communicate the crosswalk signal change message to the crosswalk controller to command one or more of a crosswalk state change and an audiovisual alert.

* * * * *